United States Patent [19]

Fischer

[11] Patent Number: 4,513,512
[45] Date of Patent: Apr. 30, 1985

[54] ANGLE-MEASURING INSTRUMENT HAVING AN INDICATOR FOR THE DEGREE OF ANGLE

[75] Inventor: Walter Fischer, Dornstetten-Aach, Fed. Rep. of Germany

[73] Assignee: Nestle & Fischer, Dornstetten, Fed. Rep. of Germany

[21] Appl. No.: 510,368

[22] Filed: Jul. 1, 1983

[30] Foreign Application Priority Data

Jul. 2, 1982 [DE] Fed. Rep. of Germany ... 8218967[U]

[51] Int. Cl.³ .............................................. G01B 3/56
[52] U.S. Cl. ...................................... 33/471; 33/1 N; 33/495
[58] Field of Search ................. 33/1 N, 471, 495, 496, 33/497, 498, 499, 500

[56] References Cited

U.S. PATENT DOCUMENTS

| | | | |
|---|---|---|---|
| 715,897 | 12/1902 | Streed | 33/499 |
| 1,060,466 | 4/1913 | Leloup | 33/495 |
| 1,500,427 | 7/1924 | Valkenburgh | 33/471 |
| 1,669,258 | 5/1928 | Luoma | 33/495 |
| 2,735,185 | 2/1956 | Naphtal | 33/497 |
| 4,442,606 | 4/1984 | Graham et al. | 33/1 N |

Primary Examiner—Richard R. Stearns
Attorney, Agent, or Firm—Becker & Becker, Inc.

[57] ABSTRACT

An angle-measuring instrument which includes two arms, which are interconnected in such a way that they can be pivoted about a common shaft, and an indicator for the angle of spread of the two arms. The shaft is rigidly connected with one of the arms, and drives the drive gear of a transmission gearing which is arranged in the at least partially hollow second arm. As a function of the angular position of the two arms relative to one another, the transmission gearing moves the indicator, which is also disposed in the hollow second arm, and in the indicating region of which a viewing window is arranged in the hollow second arm.

9 Claims, 5 Drawing Figures

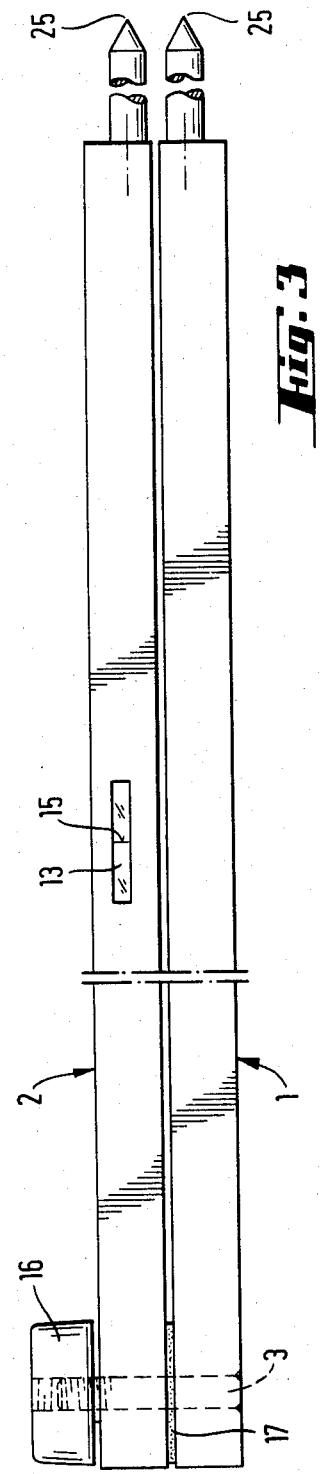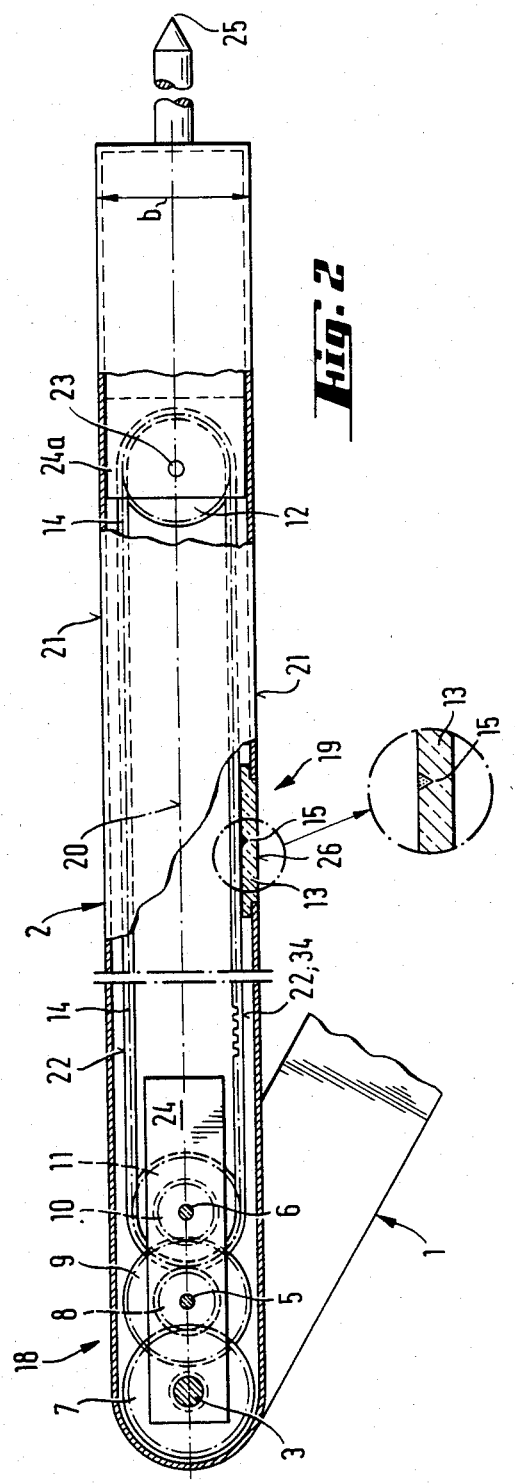

ANGLE-MEASURING INSTRUMENT HAVING AN INDICATOR FOR THE DEGREE OF ANGLE

BACKGROUND OF THE INVENTION

The present invention relates to an angle-measuring instrument which includes two arms, which are interconnected in such a way that they can be pivoted about a common shaft, and an indicator for the angle of spread of the two arms.

Known angle-measuring instruments are pivoted with a scale which surrounds the common axis in the manner of a circular ring. The angle of spread obtained between the arms can be read off on the calibration of the scale. The diameter of this scale is relatively small, as a result of which the distance between lines on the scale is so small that only a relatively approximate reading is possible.

With another known embodiment of an angle-measuring instrument, those ends of the two arms which are remote from the shaft are connected to one another by means of a tape measure, which is rigidly mounted to one of the arms and can be wound up in the other arm on a spring-loaded reel. When the angle-measuring instrument is spread apart, the tape measure is unwound, with the unwound length thereof being relied upon for determination of the angle. However, a drawback to this heretofore known instrument is that the connection of the two ends of the arms formed by the measuring tape often hinders the measuring process.

It is an object of the present invention to provide a convenient angle-measuring instrument with which, without difficulty and without disrupting attachments, outer and inner angles of parts not only can be precisely measured, but also can be indicated in such a way that such angles can be read off easily.

BRIEF DESCRIPTION OF THE DRAWINGS

The object, and other objects and advantages of the present invention, will appear more clearly from the following specification in conjunction with the accompanying drawings, in which:

FIG. 2 is a plan view of a partially broken away arm of the inventive angle-measuring instrument;

FIG. 3 is a side view of the angle-measuring instrument, with a view of the viewing window;

SUMMARY OF THE INVENTION

Figure 1:
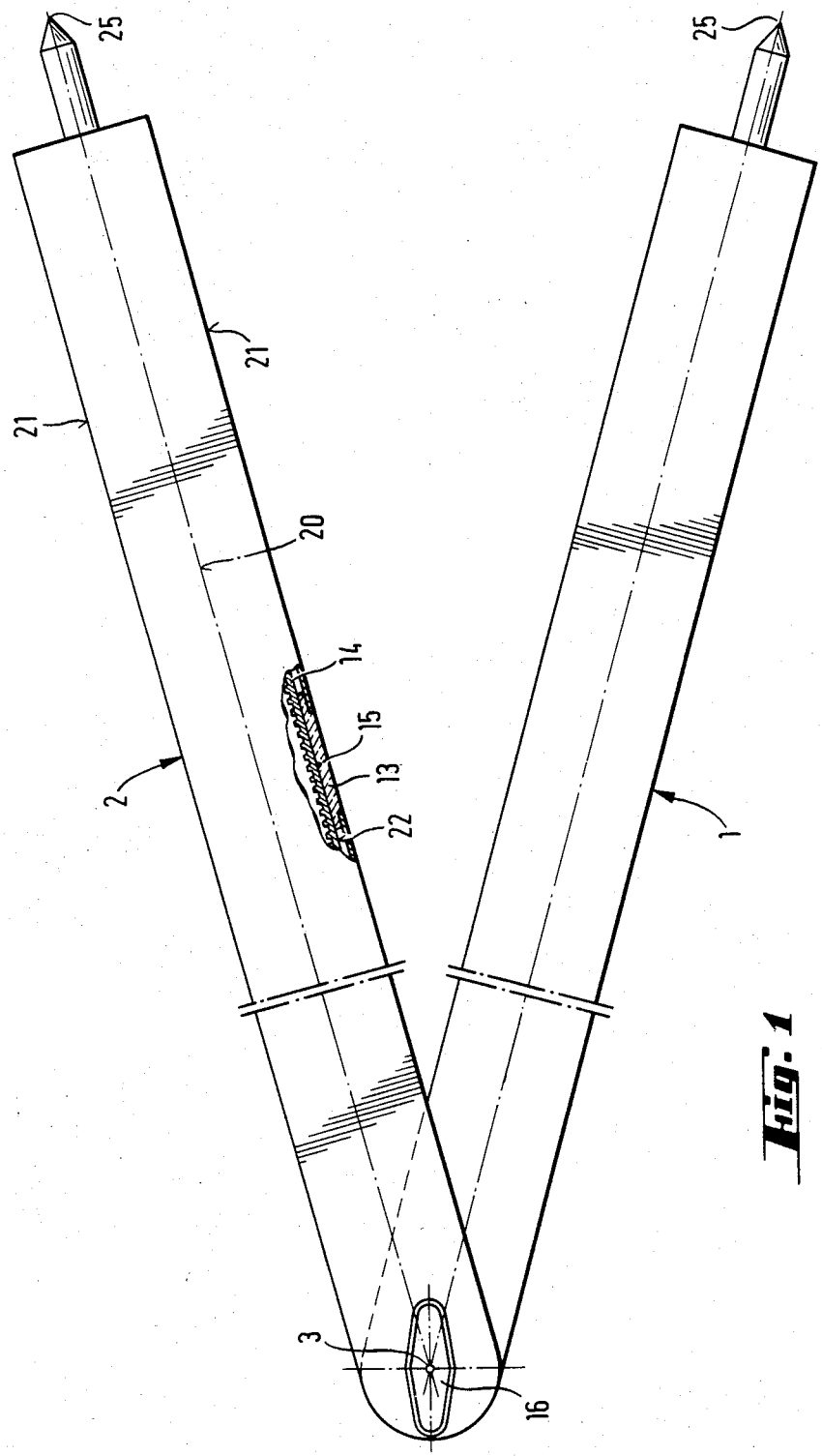
FIG. 1 is a plan view, partially broken away, of one invention embodiment of an angle-measuring instrument, with the arms spread apart.

The angle-measuring instrument of the present invention is characterized primarily in that the shaft is rigidly connected with one of the arms, and drives the drive gear of a transmission gearing which is arranged in the at least partially hollow other arm; as a function of the angular position of the two arms relative to one another, the transmission gearing moves the indicator, which is also disposed in the hollow other arm, and in the indicating region of which a viewing window is arranged in the hollow arm.

As a consequence of this inventive arrangement, the pivoting movement of the two arms is transmitted by the transmission gearing to the indicator in such a way that the measured angle of spread is proportionately increased for the indication, and can be precisely read off at the appropriately calibrated indicator in fractions of an angular degree. Since the entire arrangement is accommodated in the hollow arm of the angle-measuring instrument, the taking of measurements is not hindered.

Pursuant to further specific embodiments of the present invention, the drive gear may be a gear wheel which is rigidly connected with the shaft and which meshes with a smaller diameter gear wheel, the shaft of which is located on the longitudinal center line of the second arm. The smaller gear wheel may be rigidly connected with a coaxial gear wheel which has a larger diameter and which meshes with a further gear wheel of smaller diameter, with the shaft of the further gear wheel being located on the longitudinal center line of the second arm; the further gear wheel may be rigidly connected with a drive wheel of the indicator.

The diameter of the larger gear wheels of the transmission gearing may be only slightly less than the greatest width of the hollow second arm. The transmission gearing may be coupled with a slip-free belt drive, the endless belt of which may be guided along the viewing window, with the outer side of the endless belt, which faces the longitudinal sides of the second arm, being provided with a scale which is calibrated in degrees of angle of the angle of spread.

The viewing window may be provided with a transparent pane, on the inner side of which is placed a mark or line. The inner surface of the plane may be located in the immediate vicinity of that portion of the outer side of the endless belt which is located in the region of the viewing window. The pane may be embodied in such a way as to be optically magnifying.

The transmission gearing, with its gear wheels and the drive wheel of the belt driven thereby, may be combined into a single structural unit which is provided with two parallel plates in which the shafts of the gear wheels are mounted; the plates may be fastened on opposing inner walls of the second arm.

The endless belt may be a toothed belt, and the belt pulleys may be toothed belt pulleys. The two arms may comprise metal tubes of rectangular section.

The toothed belt pulley may be embodied as a movable tensioning pulley for the toothed belt. This pulley may be mounted in a plate arrangement, and may be pushed away from the drive wheel, hence tensioning the belt, by means of an arrangement which is associated with the plate arrangement and includes a tensioning rod, a pin, and a compression spring.

DESCRIPTION OF PREFERRED EMBODIMENTS

Referring now to the drawings in detail, the angle-measuring instrument has two arms 1 and 2 which are formed from metal tubes of rectangular section. One end of each of the arms 1 and 2 is pivotably interconnected by means of a shaft 3, and the other end of each of the arms is provided with a pointed part 25. The shaft 3 is rigidly connected to the arm 1, and passes through the end of the other arm 2. A set screw 16 is arranged on the free end of the shaft 3. By means of this set screw 16, the two arms 1 and 2 can be secured against one another, or their stability relative to one another can be adjusted, in order to lock in a determined or preselected angular measurement. A friction disk 17 (FIG. 3) is provided between the two arms 1 and 2 in order to inhance the clamping force which is to be applied by the set screw 16.

Due to its rigid connection with the arm 1, the shaft 3 turns in the arm 2 when the two arms are spread apart or brought together. This relative rotation of the shaft 3 is transmitted via a transmission gearing 18 to an indicator 19 which indicates the respective angle of spread in angular degrees in a viewing window 13 which is provided in the arm 2 (FIG. 3).

As shown in FIG. 2, the transmission gearing 18 includes a drive gear 7 which is in the form of a gear wheel, is rigidly seated on the shaft 3, and meshes with a smaller gear wheel 8. The shaft 5 of the gear wheel 8 lies on the longitudinal center line 20 of the arm 2, and is rigidly connected with a coaxially disposed larger gear wheel 9. The larger gear wheel 9 meshes with a further gear wheel 10 which has a smaller diameter and is rigidly connected with a drive gear 11 which is arranged on the shaft 6 of the gear wheel 10, and is associated with the indicator 19. The shaft 6 also lies on the longitudinal center line 20 of the arm 2. The thus embodied, multi-stage gearing 18 has a high gear ratio, so that already a small relative rotation of the shaft 3 in the arm 2, i.e. a slight spreading apart of the angle-measuring instrument, results in an angle of rotation of the drive gear 11 of the indicator 19 about the shaft 6, which angle of rotation suffices for an accurate indication or reading. In order to achieve as great a gear ratio as possible, the diameters of both the drive gear 7 and the larger gear wheel 9 correspond approximately to the greatest width "b" of the arm 2.

The drive gear 11 of the indicator 19, as mentioned above, is connected with the output (or last) gear wheel 10 of the gearing 18, and is embodied as a belt pulley which is associated with a second belt pulley 12 having the same diameter. The shaft 23 of the belt pulley 12 is located near the other end of the arm 2 on the longitudinal center line 20. An endless belt 14 is guided about the belt pulleys 11 and 12. The endless belt 14 is preferably embodied as a toothed belt, with the belt pulleys 11 and 12 being correspondingly toothed. The drive via a toothed belt is free from slipping, so that the rotation of the drive gear 7 is precisely transmitted into a longitudinal movement of the toothed belt parallel to the longitudinal sides of the arm 2.

The outer side 22 of the toothed belt 14, facing the longitudinal sides 21 of the arm 2, is provided with a scale which comprises lines. The scale is calibrated in such a way that a spreading-apart movement of the angle-measuring instrument by one degree of angle corresponds to the longitudinal movement of the toothed belt 14 by one division of the scale. The viewing window 13 is arranged on one of the longitudinal sides 21 of the arm 2, and is provided with a fine mark or line 15 which extends at right angles to the direction of travel of the belt 14. If the arms 1 and 2 of the angle-measuring instrument are spread apart, or are pivoted toward one another, the endless belt 14 travels past the viewing window 13; when the two arms have stopped moving, the angle of spread can, with the aid of the colored line 15, be precisely read off from the scale located behind it.

To protect the indicator 19, which is arranged in the metal tube of the arm 2, the viewing window 13 is covered by a transparent pane 26 which preferably has a magnifying optical system. Since the diameter of the belt pulleys 11 and 12 is only slightly less than the inside width of the arm 2 as measured in the axial plane of the belt pulleys, the toothed belt 14 runs closely adjacent to the longitudinal sides 21 of the arm 2. The pane 26 of the viewing window 13 is of such a thickness that it nearly touches the endless belt 14, with the central line 15 being provided on that side of the pane which faces the endless belt 14. The mark or line 15 is expediently formed by an indentation scratched into the pane; the indentation may be provided with colored material.

The two ends of the shafts 3, 5, and 6 of the transmission gearing 18 are respectively mounted in common in one of two plates 24 which rest against the opposing inner walls of the arm 2 symmetrical to the longitudinal center line 20 thereof. The two plates 24 can be interconnected by means of a cross piece, so that the transmission 18 as well as the drive gear 11 are combined into one structural unit which is inserted into the arm 2 and can be fastened thereto. In a similar manner, the shaft 23 of the belt pulley 12 is supported in two plates 24a which are fastened in the arm 2.

Instead of a mechanical indication of the angle obtained between the arms 1 and 2, an electrical indication is also possible. For this purpose, in the vicinity of the drive gear 11 of the indicator 19, there is arranged an electrical sensor which detects the rotation of the drive gear 11. The output signals of the sensor are converted by an electronic component into degrees of angle of the angle of spread, and are indicated by a preferably digital indicator which is disposed in the arm similar to the viewing window 13.

The transmission gearing 18 can also be embodied as a friction wheel gearing, or a mixed gearing having gear wheels and friction wheels.

Figure 5:
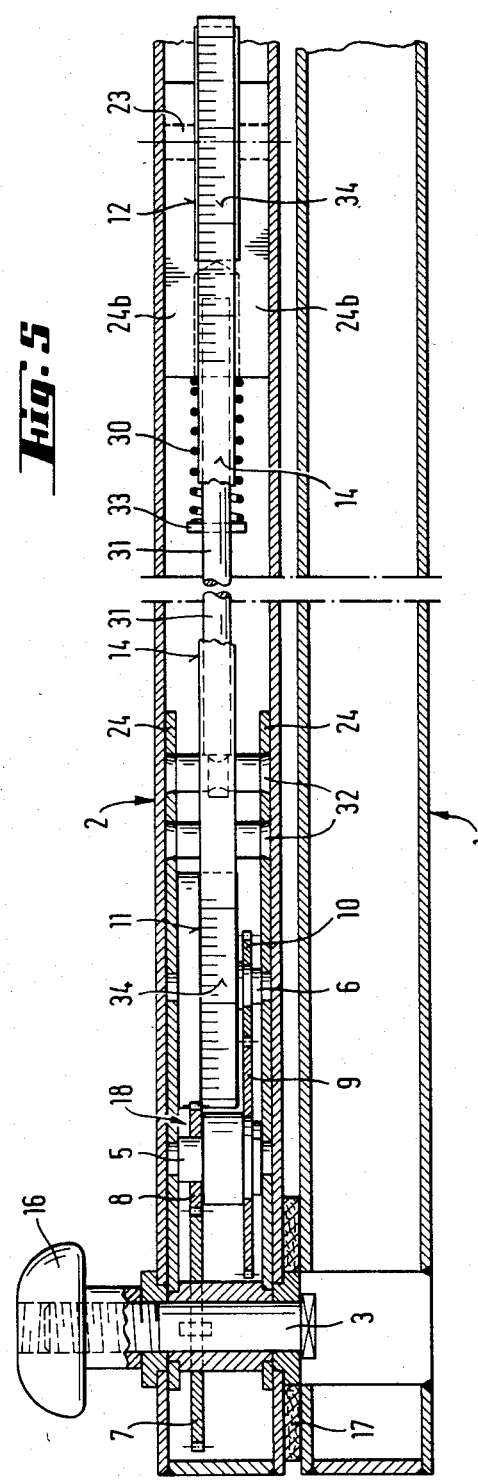
FIG. 5 is a sectional view taken along line V—V in FIG. 4.
Figure 4:
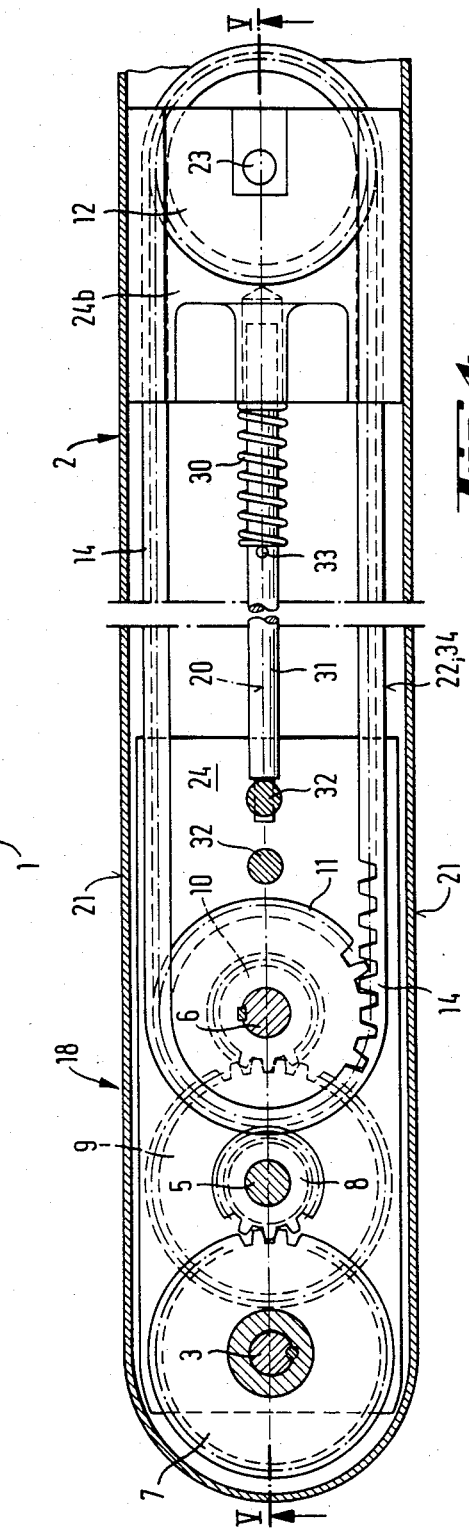
FIG. 4 is a section through another inventive embodiment of an angle-measuring instrument.

The construction of the modified embodiment shown in FIGS. 4 and 5 basically corresponds to that of FIGS. 1–3. Therefore, corresponding parts are designated with the same reference numerals, and will only be discussed as needed in connection with the modifications.

FIG. 5 shows the two plates 24, which are spaced from one another, in their mounted state, by means of spacers, which in the illustration are in the form of pins 32. One end of a tensioning rod 31 is supported in one of the spacer pins 32. A plate arrangement 24b is movably disposed on the other end of the rod 31. The toothed tensioning pulley 12 is mounted in the plate arrangement 24b by means of the shaft 23. A compression spring 30 is supported on a pin 33 of the rod 31. This spring 30 pushes the tensioning pulley 12 away from the drive gear or toothed belt pulley 11. As a result, the toothed belt 14 is kept under constant tension. This constant tension makes possible the accuracy of the scale 34, which is provided on the outer side 22 of the belt 14.

The present invention is, of course, in no way restricted to the specific disclosure of the specification and drawings, but also encompasses any modifications within the scope of the appended claims.

What I claim is:
1. An angle-measuring instrument, comprising;
 a first arm;
 a first shaft rigidly connected to said first arm;
 a second, at least partially hollow, arm which is connected to said first arm via said first shaft in such a way as to be pivotable relative thereto;
 an indicator having a drive wheel, said indicator being disposed in said second arm and serving, by means of an indicating region, to indicate the angle of spread of said first and second arms relative to one another;

a viewing window arranged in said second arm in said indicating region of said indicator;

a transmission gearing, which is operative to move said indicator and is disposed in said second arm, and is provided with a drive gear which is driven by said first shaft as a function of the angular position of said first and second arms relative to one another;

a slip-free belt drive which is associated with said indicator and said transmission gearing, said belt drive including said drive wheel of said indicator, and an endless belt, the outer side of which, which faces the longitudinal sides of said second arm, being provided with a scale calibrated in degrees of angle of said angle of spread, and being guided along said viewing window, said viewing window being provided with a transparent pane, the inner side of which is provided with a line; and at any given time, a portion of the outer side of said endless belt being in the vicinity of said viewing window, with the inner surface of said pane thereof being in the immediate vicinity of said last-mentioned portion of said endless belt.

2. An angle-measuring instrument according to claim 1, in which said transparent pane of said viewing window optically is adapted to magnify.

3. An angle-measuring instrument according to claim 1, in which said drive wheel is a first toothed belt pulley; in which said belt drive includes a second toothed belt pulley; and in which said endless belt is a toothed belt.

4. An angle-measuring instrument according to claim 3, in which said second toothed belt pulley is constructed as a movable tensioning disc means for said endless belt, which second toothed belt pulley is mounted in a plate arrangement whereby via a tensioning rod having the plate arrangement movably disposed thereon as well as a pin of said rod and a compression spring supported on the pin of said rod there is made possible variation in spacing of said second toothed belt pulley from said first toothed belt pulley that is fixed.

5. An angle measuring instrument according to claim 3, which includes: a tensioning rod, one end of which is associated with said second arm; a plate arrangement movably disposed on the other end of said tensioning rod, with said second toothed belt pulley being mounted on said plate arrangement; and a compression spring supported on said tensioning rod in such a way as to urge said plate arrangement, and hence said second toothed belt pulley, away from said first toothed belt pulley for keeping said toothed belt tensioned.

6. An angle-measuring instrument according to claim 1, in which each of said first and second arms is a metal tube of rectangular cross section.

7. An angle-measuring instrument according to claim 1, in which said drive gear is a first gear wheel which is rigidly connected with said first shaft; and in which said transmission gearing is provided with a second gear wheel having a diameter which is less than the diameter of said first gear wheel, with said first gear wheel meshing with said second gear wheel; said second gear wheel being associated with a second shaft, which is located on the longitudinal center line of said second arm, and a third gear wheel which is coaxial with, is rigidly connected to, and has a larger diameter than, said second gear wheel; in which said transmission gearing is provided with a fourth gear wheel having a diameter which is less than the diameter of said third gear wheel, with said third gear wheel meshing with said fourth gear wheel; said fourth gear wheel being associated with a third shaft, which is located on the longitudinal center line of said second arm; and in which said indicator is provided with a drive wheel which is rigidly connected with said fourth gear wheel.

8. An angle-measuring instrument according to claim 7, in which said transmission gearing, which includes said first through fourth gear wheels, and said drive wheel of said belt drive driven thereby, are combined into a single structural unit, which includes two parallel plates in which said first, second, and third shafts are mounted; said plates are fixed on opposing inner walls of said second arm.

9. An angle-measuring instrument according to claim 7, in which the diameter of said larger diameter first and third gear wheels of said transmission gearing are only slightly less than the greatest width of said second arm.

* * * * *